US007407131B1

(12) United States Patent
Corda et al.

(10) Patent No.: US 7,407,131 B1
(45) Date of Patent: Aug. 5, 2008

(54) METHOD FOR CREATING AN AERONAUTIC SOUND SHIELD HAVING GAS DISTRIBUTORS ARRANGED ON THE ENGINES, WINGS, AND NOSE OF AN AIRCRAFT

(75) Inventors: Stephen Corda, Lancaster, CA (US); Mark Stephen Smith, Lancaster, CA (US); David Daniel Myre, Crofton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 75 days.

(21) Appl. No.: 11/288,052

(22) Filed: Nov. 14, 2005

(51) Int. Cl.
*B64C 1/40* (2006.01)
*B64C 23/00* (2006.01)
*B64C 15/00* (2006.01)
*B64B 1/00* (2006.01)
*B64B 1/36* (2006.01)
*B64G 1/26* (2006.01)
*B64D 1/00* (2006.01)

(52) U.S. Cl. .................... 244/1 N; 244/159.1; 244/169; 244/52; 244/136

(58) Field of Classification Search ................ 244/1 N, 244/134 C, 136, 135 A, 159.1, 207, 51, 52, 244/135, 53 B, 199.1, 199.2, 199.3, 204.1, 244/73 R
See application file for complete search history.

(56) References Cited

U.S. PATENT DOCUMENTS

| | | | | |
|---|---|---|---|---|
| 2,941,759 A * | 6/1960 | Schwartz et al. | ......... | 244/117 A |
| 3,259,065 A * | 7/1966 | Ross et al. | ................... | 244/3.1 |
| 3,267,857 A * | 8/1966 | Lindberg, Jr. | ............ | 244/159.1 |
| 3,410,502 A * | 11/1968 | Leadon et al. | .............. | 244/164 |
| 3,510,095 A * | 5/1970 | Chuan | ........................ | 244/130 |
| 3,527,430 A * | 9/1970 | Smith | ........................ | 244/53 A |
| 3,599,429 A * | 8/1971 | Bigelis et al. | ............. | 60/39.092 |
| 3,614,038 A * | 10/1971 | Nichols | ................... | 244/134 C |
| 3,620,484 A * | 11/1971 | Schoppe et al. | ............. | 244/130 |
| 3,725,282 A * | 4/1973 | Weinberg | ...................... | 252/62 |
| 3,785,591 A * | 1/1974 | Stalmach, Jr. | ............ | 244/171.8 |
| 3,929,305 A * | 12/1975 | Sabol | ...................... | 244/117 A |
| 4,014,485 A * | 3/1977 | Kinnaird et al. | ......... | 244/117 A |
| 4,504,031 A * | 3/1985 | Andrews | ...................... | 244/113 |
| 4,917,335 A * | 4/1990 | Tidman | ....................... | 244/130 |
| 4,923,146 A * | 5/1990 | Anthony | ................. | 244/117 A |
| 5,200,621 A * | 4/1993 | Manuel et al. | .............. | 250/330 |
| 5,257,757 A * | 11/1993 | Paul et al. | ............... | 244/117 A |

(Continued)

*Primary Examiner*—Michael R. Mansen
*Assistant Examiner*—Joshua J Michener
(74) *Attorney, Agent, or Firm*—Mark Homer

(57) ABSTRACT

The present invention blocks and/or attenuates the upstream travel of acoustic disturbances or sound waves from a flight vehicle or components of a flight vehicle traveling at subsonic speed using a local injection of a high molecular weight gas. Additional benefit may also be obtained by lowering the temperature of the gas. Preferably, the invention has a means of distributing the high molecular weight gas from the nose, wing, component, or other structure of the flight vehicle into the upstream or surrounding air flow. Two techniques for distribution are direct gas injection and sublimation of the high molecular weight solid material from the vehicle surface. The high molecular weight and low temperature of the gas significantly decreases the local speed of sound such that a localized region of supersonic flow and possibly shock waves are formed, preventing the upstream travel of sound waves from the flight vehicle.

7 Claims, 7 Drawing Sheets

U.S. PATENT DOCUMENTS

| | | | |
|---|---|---|---|
| 5,299,762 A * | 4/1994 | Kosson et al. | 244/117 A |
| 5,452,866 A * | 9/1995 | Bulman | 244/117 A |
| 5,458,299 A * | 10/1995 | Collins et al. | 244/134 C |
| 5,526,999 A * | 6/1996 | Meston | 244/2 |
| 6,763,651 B2 * | 7/2004 | Shmilovich et al. | 60/39.092 |
| 7,267,303 B1 * | 9/2007 | Teter et al. | 244/159.1 |
| 2001/0019090 A1 * | 9/2001 | Horev | 244/136 |
| 2006/0060711 A1 * | 3/2006 | Foianini et al. | 244/136 |

* cited by examiner

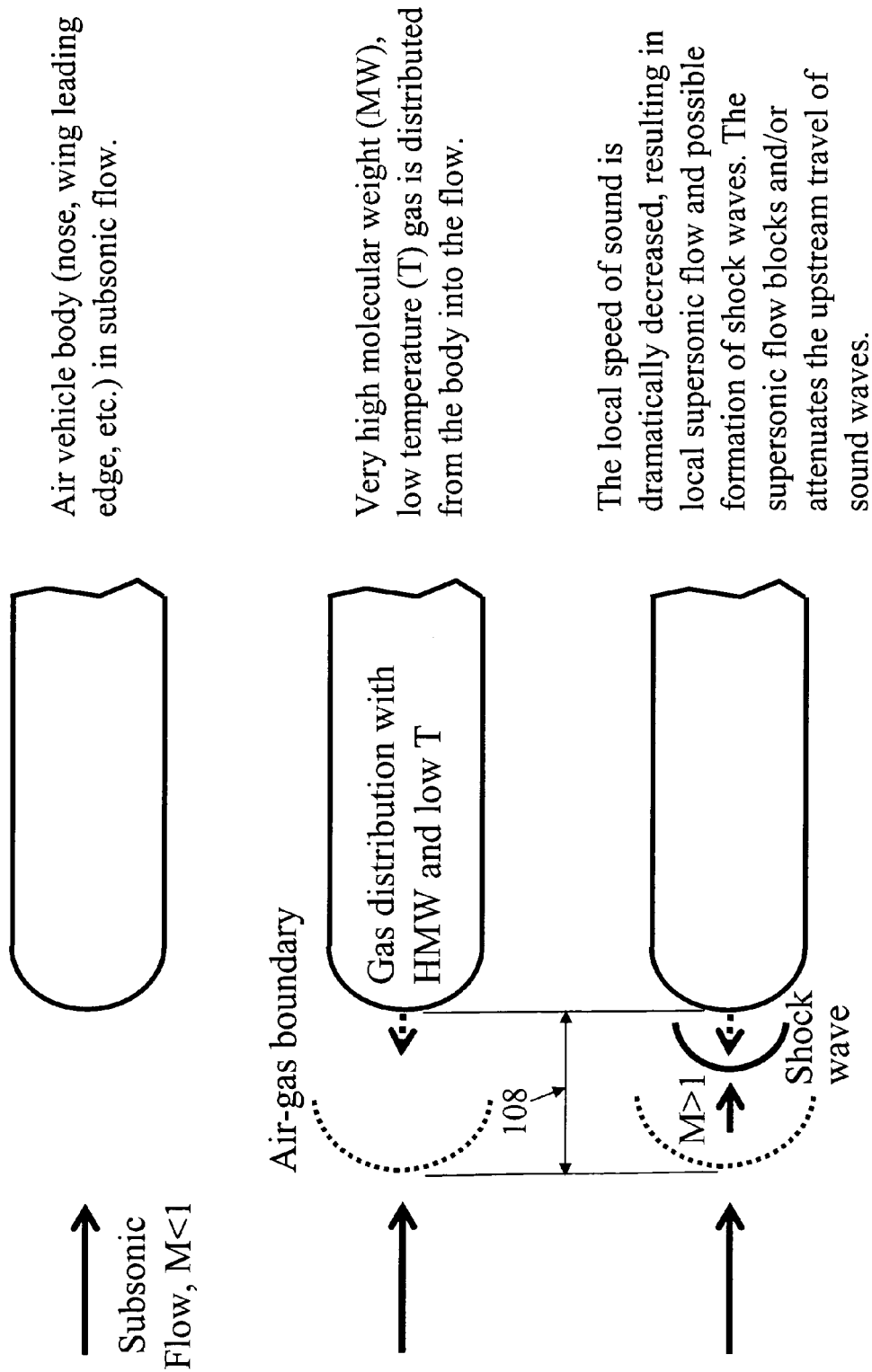
Fig. 3. Sound shield concept.

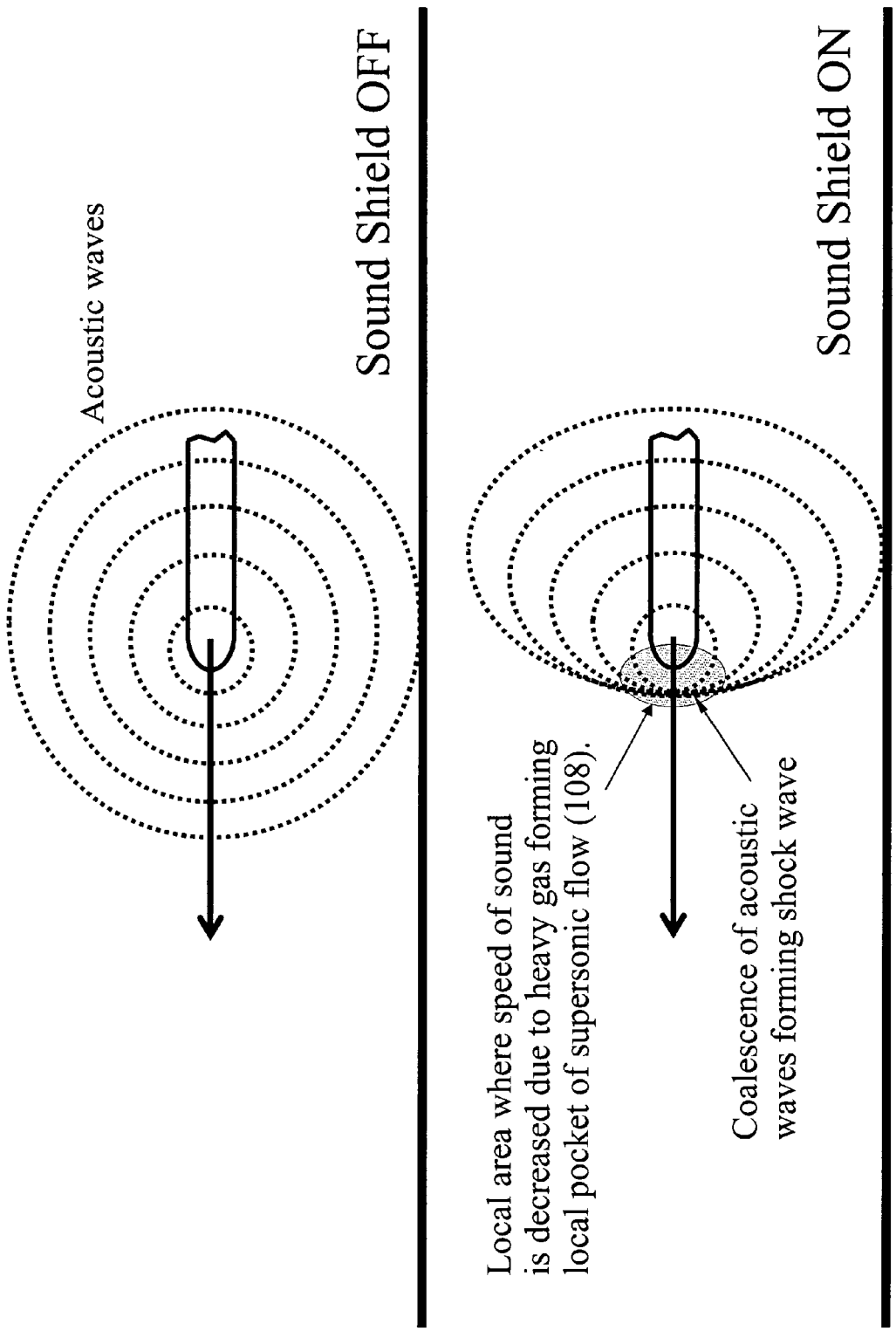
Fig. 4. Sound shield operation.

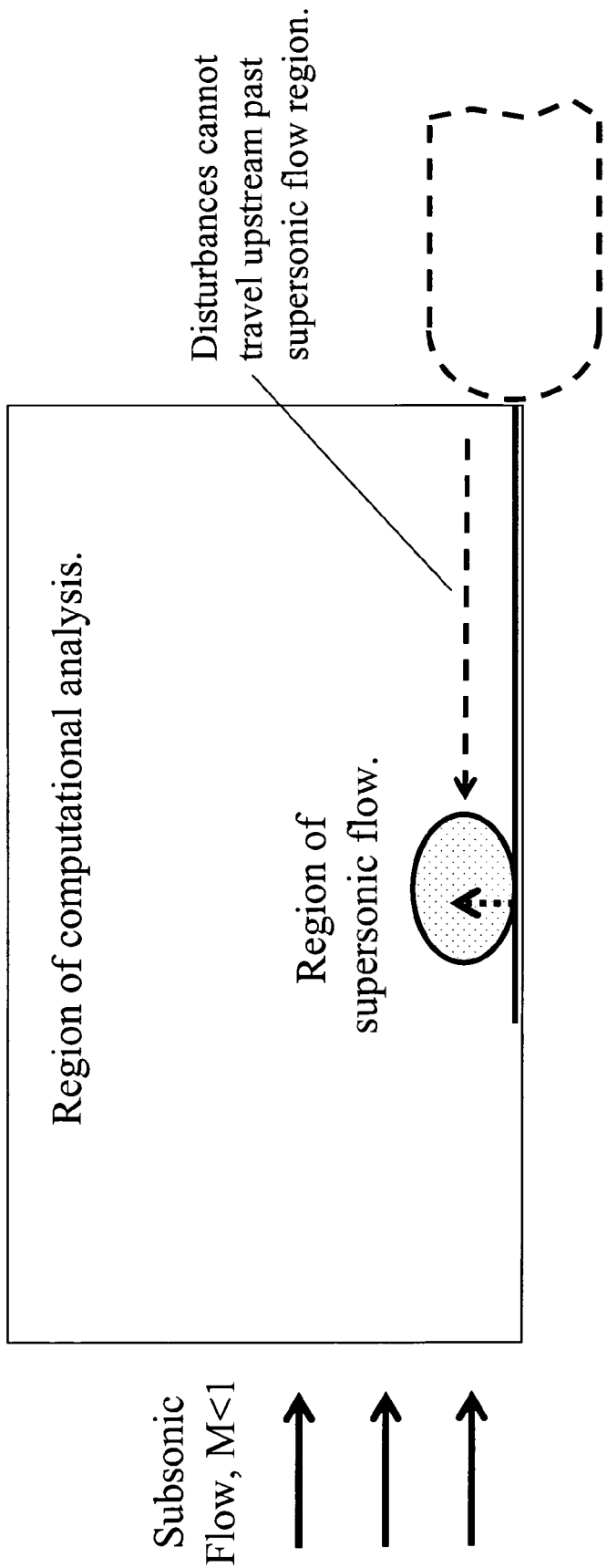
Fig. 5. Computational fluid dynamic analysis model.

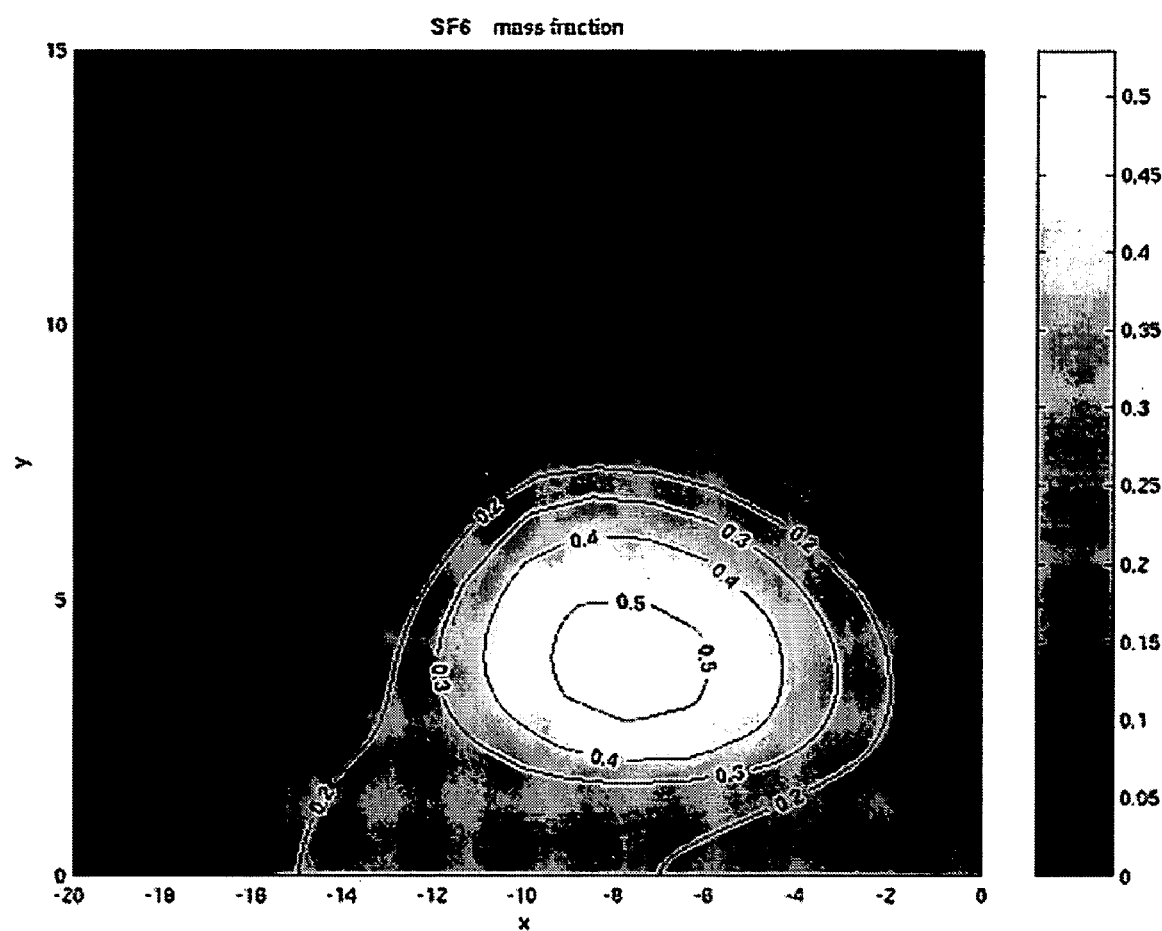
Fig. 6. SF$_6$ mass fraction with transverse injection (flow is from left to right).

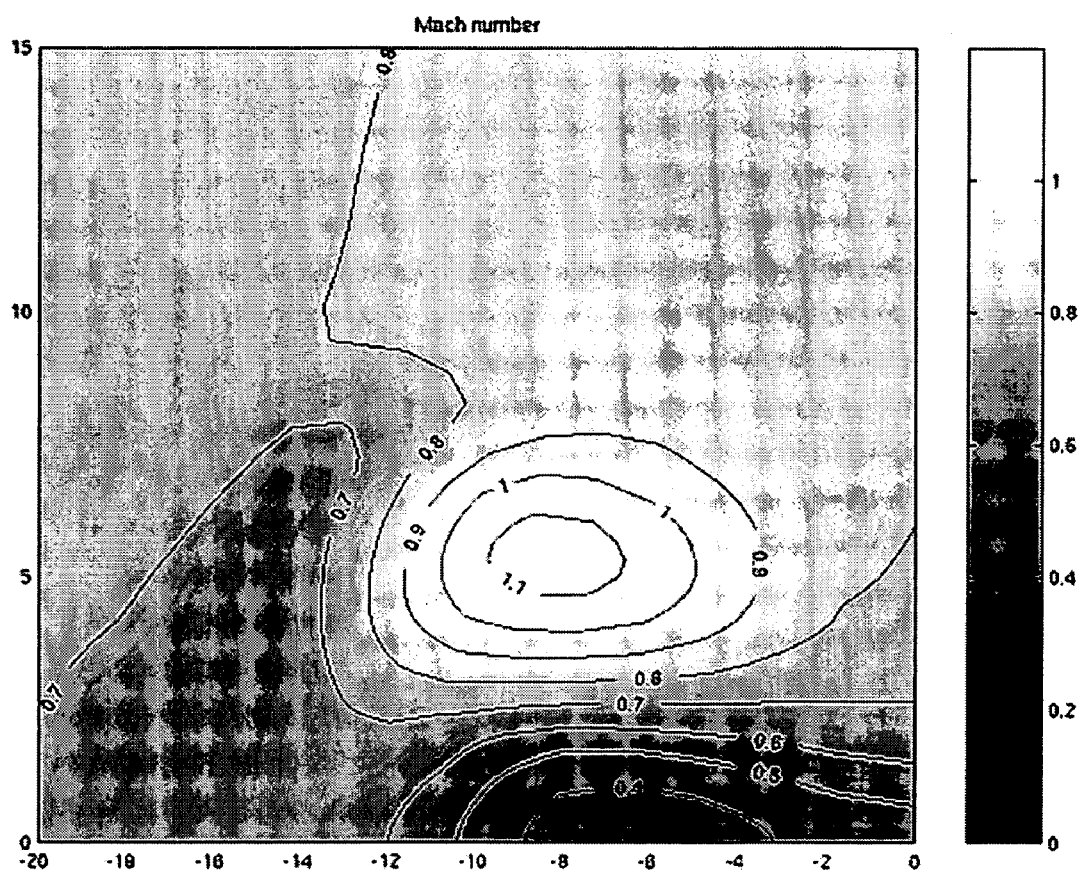
Fig. 7. Mach number contours with $SF_6$ injection (flow is from left to right).

METHOD FOR CREATING AN AERONAUTIC SOUND SHIELD HAVING GAS DISTRIBUTORS ARRANGED ON THE ENGINES, WINGS, AND NOSE OF AN AIRCRAFT

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally modifying the local speed of sound characteristics of a gas or fluid flow, more particularly to modifying these characteristics using the distribution of a high molecular weight and/or low temperature gas into to the flow, and most particularly to attenuating the acoustic disturbance and/or noise associated with aircraft by modifying the local speed of sound characteristics using high molecular weight and/or low temperature gas upstream of the aircraft.

2. Description of the Related Art

Reduction of noise generated by jet engines has become an important aspect of aircraft design. Sound waves from aircraft traveling at subsonic speed propagate in all directions relative to the aircraft. The reduction of noise generated by aircraft has obvious benefits, including reducing noise pollution and, thereby, reducing safety risks to persons in the vicinity of aircraft. Also, sound waves have a tendency to contribute to wear and fatigue of aircraft components.

Many technical solutions have been employed in order to reduce noise generated by aircraft. These include using physical barriers attached to aircraft in order to provide a physical shield to block or attenuate sound waves and injecting gases directly into the jet engine exhaust in order to suppress noise. These solutions provide some reduction to noise levels, but normally result in some reduction in aircraft efficiency or performance. In addition, all of these solutions relate to decreasing sound waves only "downstream" from the aircraft, but do not address sound waves emanating "upstream" from the aircraft.

Therefore, it is desired to provide a relatively low-cost apparatus and method to attenuate or block aircraft noise emanating in any direction from an aircraft, without affecting aircraft performance.

SUMMARY OF THE INVENTION

The invention proposed herein comprises a device and method for blocking an/or attenuating the upstream movement of acoustic disturbances or sound waves emanating from an aircraft flying at subsonic speeds. By blocking the acoustic disturbances, the invention eliminates or reduces the sound perceived by an approaching aircraft.

Accordingly, it is an object of this invention to provide a method to block or attenuate acoustic disturbances or sound waves emanating from an aircraft flying at subsonic speeds.

It is a further object of this invention to provide a shield for acoustic disturbances or sound waves emanating from an aircraft that does not significantly degrade aircraft performance.

It is yet a further object of this invention to provide a method to reduce noise from an aircraft that is relatively low-cost.

This invention meets these and other objectives related to reducing aircraft sound by providing a device and method to block the upstream travel of sound waves by the formation of local supersonic flow and possibly shock waves due to an increase in the local speed of sound. By distributing a high molecular weight, and preferably, low temperature gas into the air flow upstream or around an aircraft or flight vehicle, the local speed of sound is greatly decreased, thereby producing local areas of supersonic flow. Shock waves form upstream and around the aircraft structure in these pockets of supersonic flow. The acoustic disturbances and/or sound waves from the flight vehicle can be blocked and/or attenuated with the appropriate positioning of gas injection locations.

In addition, the pockets of supersonic flow and local shock waves alter the pressure distribution around the aircraft. This change in the pressure distribution leads to changes in the aerodynamic and stability and control characteristics of the aircraft. This could be used advantageously to impart forces and moments to the aircraft, providing an alternative method of controlling the aircraft without the use of conventional, moving control surfaces.

BRIEF DESCRIPTION OF THE DRAWINGS

In the drawings, which are not necessarily to scale, like or corresponding parts are denoted by like or corresponding reference numerals.

FIG. 3 depicts changes to the local airflow around a portion of an aircraft employing the present invention.

FIG. 4 depicts the movement of acoustic waves from a portion of an aircraft when the invention is both employed and also not employed.

FIG. 5 depicts a representation of a computational fluid dynamic analysis model of the invention.

FIG. 6 depicts the mass fraction distribution of gas transversely injected into the subsonic flow around an aircraft.

FIG. 7 depicts the Mach number distribution with direct gas injection around an aircraft.

DESCRIPTION OF PREFERRED EMBODIMENTS

Figure 1:
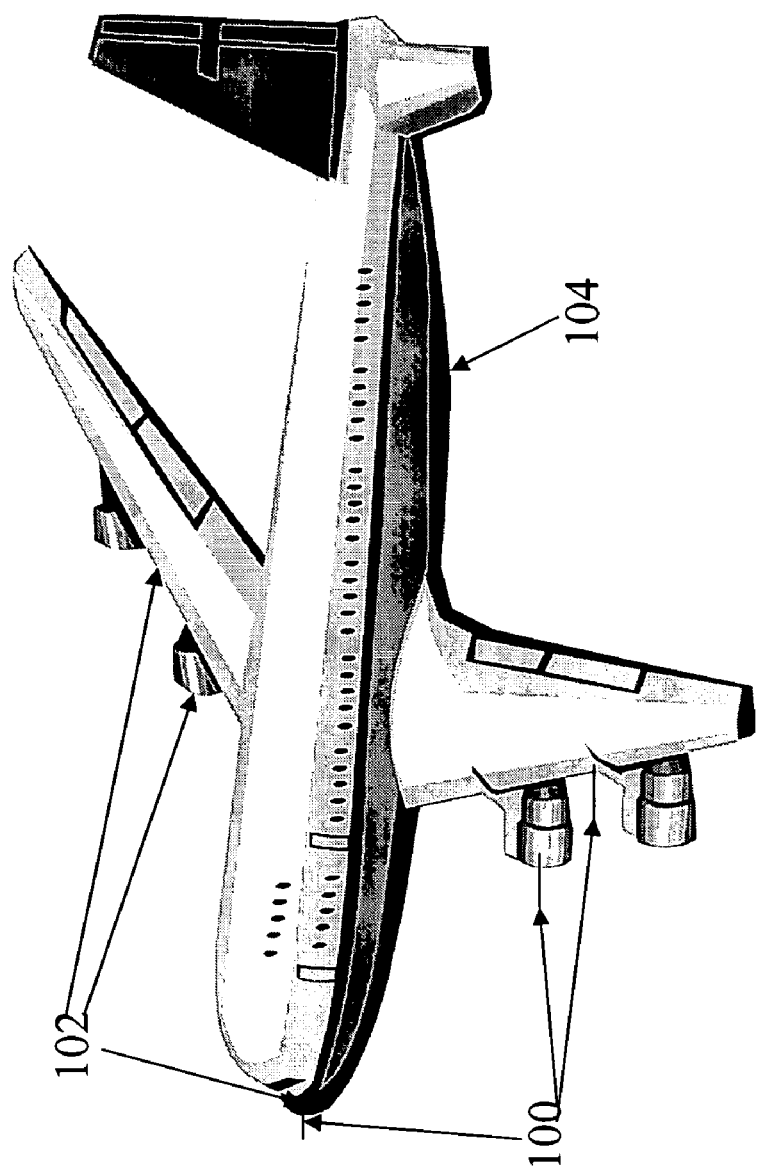
FIG. 1 depicts an aircraft employing the present invention.

The invention, as embodied herein, comprises a device and method for blocking and/or attenuating acoustic waves emanating from aircraft. The invention also provides a method for controlling an aircraft by altering the pressure distribution around the aircraft.

In general, the invention provides for distributing a high molecular weight gas ("HMW gas") into the airflow adjacent/around the aircraft. As used herein, the term "high molecular weight gas" means a gas having a molecular weight of above 100. The HMW gas creates a local area or pocket wherein the speed of sound is reduced, compared to the surrounding airflow. Due to the reduction of the speed of sound in the local area, local areas of supersonic flow, and possibly shock waves, will be formed. Acoustic disturbances or sound waves emanating from the aircraft will be blocked or attenuated by the local areas of supersonic flow. The HMW gas may be distributed into the airflow at a position, or multiple positions, where the user determines it is appropriate to block acoustic waves emanating from the aircraft.

In addition to blocking acoustic waves, the local areas of supersonic flow and local shock waves alter the pressure distribution around the aircraft. By altering the pressure distribution around aircraft, changes in the aerodynamic and stability and control characteristics of the aircraft occur. Thus, by changing these characteristics, forces may be imparted to portions of the aircraft in order to alter the aircraft's direction.

Referring to FIGS. 1-4, the invention comprises one or more gas distributors 100 positioned on a structure 102 of an aircraft 104 traveling at subsonic speeds. The gas distributors 100 distribute a HMW gas 106 to an area where the user desires to provide reduction in noise created by the aircraft 104. The HMW gas 106 decreases the speed of sound in a local area 108 where it is distributed. The size of the local area 108 is dependant upon the amount and speed at which the HMW gas 106 is distributed, which may be selected by one skilled in the art consistent with the disclosure herein.

In operation, the HMW gas 106 is distributed to form a local area 108 of supersonic flow and possibly shock waves due to a decrease in the local area speed of sound. Acoustic waves 110 emanating from the aircraft 104 are blocked or attenuated by the local area 108 of supersonic flow and shock waves.

The gas distributors 100 may employ any mechanism that provides for distributing the HMW gas 106 to create local areas 108 of supersonic flow sufficient in size to provide the desired attenuation of noise from portions of or from an entire aircraft 104. Two preferred gas distributor 100 mechanisms are an injection system 212 (shown in FIGS. 2a and 2b) and a sublimation system 214 (shown in FIG. 2c).

Figures 2A, 2B, 2C:
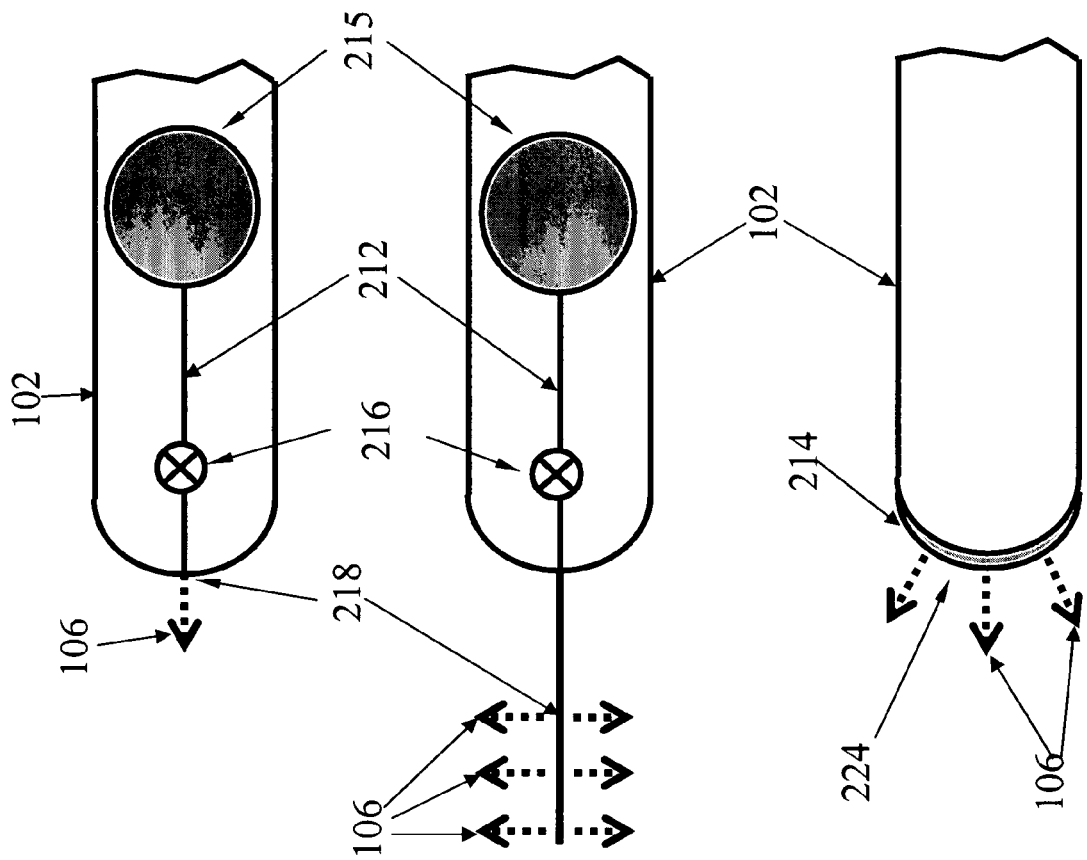
FIG. 2a depicts a portion of an aircraft employing a direct injection gas system embodiment of the present invention.
FIG. 2b depicts a portion of an aircraft employing a transverse injection gas system embodiment of the present invention.
FIG. 2c depicts a portion of an aircraft employing a sublimation system embodiment of the present invention.

One preferred injection system 212 is a direct injection system as shown in FIG. 2a. For the direct gas injection system, typical components include a gas storage tank 215, a gas injection valve 216, and a gas injector 218. In this system, the HMW gas 106 is stored at high pressure in the gas storage tank 214 and the gas injection valve 216 is opened to feed the HMW gas 106 through the gas injector 218 into the air flow. Gas injection pressures may be controlled by a regulator, thus controlling the gas penetration distance and dispersion.

Another preferred injection system 212 is a transverse injection system as shown in FIG. 2b. The components of a transverse injection system include the same components described above for a direct injection system except the gas injector 218 is replaced by an extended boom 220 that extends from the structure 102 and distributes the HMW gas 106 through one or more injectors 222 at the end of the boom 220.

A preferred sublimation system 214 is shown in FIG. 2c. This system includes a coating 224 that is applied to the structure 102 that remains adhered, in a chemically unaltered form, to the structure 102 until the aircraft 104 is airborne. As the aircraft 104 travels, the coating 224 sublimes directly into a HMW gas 106. The coating 224 may be covered prior to use of the aircraft 104 to ensure that it does not sublime prematurely (prior to use of the aircraft). In such a system 214, the coating 224 would be made of a liquid/solid version of the HMW gas 106 material.

The structure 102 or portion of an aircraft where the gas distributors 100 are attached may be selected depending upon the type and location of sound emanating from the aircraft 104 one desires to attenuate. For certain applications of the present invention, it may be desired to ensure that acoustic waves from the aircraft 104 do not travel upstream of the aircraft 104 to prevent said waves from reaching persons in front of the aircraft 104. For these applications, it would be preferred to place the gas distributors 100 on the nose and/or leading edges of the aircraft 104. To specifically attenuate engine noise, the gas distributors 100 may be placed on the engines or on the wings adjacent to the engines. To provide control of the aircraft 104 through altering pressure distribution as described above, gas distributors 100 may be placed on or near the wings, tail section, or nose of the aircraft 104.

A HMW gas 106 has a molecular weight of at least 100. For comparison, air has a molecular weight of 29. It is preferred that the HMW gas 106 has a molecular weight above 120 and it is most preferred that the HMW gas 106 has a molecular weight above 140. Many monatomic and polyatomic gases and gas mixtures may be employed as HMW gases 106 to be used in the present invention. Some characteristics favorable to integration with the invention include being colorless, odorless, non-toxic, nonflammable, chemically inert, and thermally stable. Preferred candidate gases should also be readily available from commercial sources and relatively inexpensive.

Examples of such HMW gases 106 are monatomic Xenon, Xe, (molecular weight of 131) and polyatomic n-perfluorobutane, $C_4F_{10}$, (molecular weight of 238). Other refrigerant gases, such as R134A (molecular weight of 102) and R125 (molecular weight of 125), may also be considered. The use of gas mixtures may be especially interesting in terms of the capability of formulating "custom" HMW gases 106 with desired properties.

One particular preferred HMW gas 106 for the present invention is sulfur hexafluoride, $SF_6$, (molecular weight of 146), which was used for some of the calculations below to further describe the present invention. It possesses many characteristics favorable to integration with the invention, such as being colorless, odorless, non-toxic, nonflammable, chemically inert, and thermally stable. $SF_6$ is readily available from commercial sources and is inexpensive. $SF_6$ is commonly used as an insulating gas in electrical equipment and as an etchant in the semiconductor industry. It is chemically inert and stable in the presence of most materials to temperatures of about 500° C. (932° F.). At atmospheric pressure, $SF_6$ sublimes directly from a solid to a gas.

It is also preferred that the HMW gas 106 be provided at a temperature below ambient. As used herein, ambient temperature is the temperature of air outside of an aircraft 104. As shown further below, the reduction in the speed of sound is increased as the temperature of the HMW gas 106 decreases below ambient.

The following briefly describes the mathematical basis of the present invention.

The local speed of sound, a, is defined in Equation 1, where γ is the ratio of specific heats, $R_{air}$ is the specific gas constant for air, and T is the local temperature.

$$a = \sqrt{\gamma R_{air} T} \qquad \text{(EQN. 1)}$$

The local Mach number, M, is related to the local velocity, V, and speed of sound using Equation 2.

$$M = \frac{V}{a} \qquad \text{(EQN. 2)}$$

The specific gas constant can be related to the universal gas constant, $R_{universal}$, and the molecular weight, MW, using Equation 3.

$$R_{air} = \frac{R_{universal}}{MW} \quad \text{(EQN. 3)}$$

Substituting Equation 3 into Equation 1, the speed of sound is given by Equation 4.

$$a = \sqrt{\gamma \frac{R_{universal}}{MW} T} \quad \text{(EQN. 4)}$$

For constant values of the ratio of specific heats and the universal gas constant, the speed of sound may be decreased by increasing the molecular weight and decreasing the temperature. By decreasing the local speed of sound sufficiently, the local Mach number may reach supersonic values (M>1) in a subsonic velocity flow.

The following numerical example demonstrates the desired effect of the present invention by employing the above principles and equations.

Assuming an aircraft is flying at an altitude of 6,000 meters (19,685 feet) and a velocity of 130 meters/second (426.5 ft/sec, 252.7 knots). Assuming $\gamma_{air}=1.4$ and standard temperature at 6,000 meters altitude of $T_{air}=249.2$ K ($-11.11°$ F.), the speed of sound is given by Equation 1.

$$a = \sqrt{\gamma_{air} R_{air} T} = \sqrt{(1.4)\left(287 \frac{J}{kg-K}\right)(249.2K)} = 316.4 \text{m/sec}(1,038 \text{ft/sec})$$

The Mach number is given by Equation 2.

$$M = \frac{V}{a} = \frac{130 \text{m/sec}}{316.4 \text{m/sec}} = 0.411$$

At these conditions, the aircraft is subsonic. Assuming sulfur hexafluoride, $SF_6$, ($\gamma_{SF6}=1.095$, $MW_{SF6}$ 146) is injected into the flow at the same temperature as the freestream air, the local speed of sound is given by Equation 4.

$$a = \sqrt{\gamma_{SF6} \frac{R_{universal}}{MW_{SF6}} T} = \sqrt{(1.095)\left(\frac{8314 \frac{J}{kgmol-K}}{146}\right)(249.2K)} = 124.7 \text{m/sec}$$

The local Mach number is now slightly supersonic.

$$M = \frac{V}{a} = \frac{130 \text{m/sec}}{124.7 \text{m/sec}} = 1.04$$

The effect of temperature can be seen if the sulfur hexafluoride is injected at its sublimation temperature of $-63.9°$ C. (209.25 K, $-83.0°$ F.). The speed of sound is decreased by about 8.4%.

$$a = \sqrt{\gamma_{SF6} \frac{R_{universal}}{MW_{SF6}} T} = \sqrt{(1.095)\left(\frac{8314 \frac{J}{kgmol-K}}{146}\right)(209.25K)} = 114.2 \text{m/sec}$$

The Mach number is increased by about 9.6%.

$$M = \frac{V}{a} = \frac{130 \text{m/sec}}{114.2 \text{m/sec}} = 1.14$$

The table below summarizes the results of this numerical example.

Altitude=6,000 m (19,685 ft)
Velocity=130 m/sec (426.5 ft/sec)

|  | No $SF_6$ Injection | $SF_6$ Injection, Ambient Temperature | $SF_6$ Injection, Low Temperature |
|---|---|---|---|
| $SF_6$ Temperature °K (°F.) | None | 249.2 (−11.11) | 209.3 (−83.0) |
| Speed of Sound, a m/sec (ft/sec) | 316.2 (1,038) | 124.7 (409.1) | 114.2 (374.7) |
| Mach number, M | 0.411 | 1.04 | 1.14 |

Referring to FIGS. 4-6, representative results of computational fluid dynamics (CFD) analyses of the invention are depicted. The CFD analysis is a two-dimensional, viscous, non-reacting, unsteady numerical solution.

FIG. 4 shows a computational fluid dynamic analysis model. Air enters the inflow plane on the left of the figure at a subsonic Mach number of about 0.78. $SF_6$ gas is injected transversely into the air flow at the lower boundary, downstream of the inflow.

FIG. 5 shows the $SF_6$ mass fraction distribution for injection of $SF_6$ gas transversely into the subsonic air flow. The injection distributes a pocket of HMW gas into the main subsonic flow.

FIG. 6 shows the Mach number contour map with $SF_6$ injection. The subsonic flow enters the pocket of high molecular weight $SF_6$ gas, where the speed of sound is substantially reduced. The flow becomes locally supersonic in the $SF_6$ gas pocket and reaches a supersonic Mach number of about 1.1. Disturbances produced downstream of the supersonic flow region cannot propagate upstream.

What is described are specific examples of many possible variations on the same invention and are not intended in a limiting sense. The claimed invention can be practiced using other variations not specifically described above.

What is claimed is:

1. A method for creating a noise attenuating shield comprising the steps of:
   providing an aircraft comprising at least a jet engine attached to each main wing of the aircraft;
   providing at least a gas distributor positioned on each jet engine attached to each main wing;
   providing a high molecular weight gas, the gas comprising at least a molecular weight above one hundred, operationally associated with the gas distributor;

flying the aircraft at subsonic speeds wherein the gas distributor distributes gas into airflow adjacent to and upstream of each engine attached to each main wing and each main wing of the aircraft flying at subsonic speeds; and creating a local area of decreased speed of sound upstream and adjacent to each engine attached to each main wing and each main wing of the aircraft.

2. The method of claim 1, wherein the gas distributor comprises a gas injection system.

3. The method of claim 1, wherein the high molecular weight gas comprises a temperature below ambient.

4. The method of claim 1, wherein the high molecular weight gas comprises a molecular weight above 120.

5. The method of claim 1, wherein the high molecular weight gas comprises a molecular weight above 140.

6. The method of claim 1, wherein the high molecular weight gas is selected from the group of sulfur hexafluoride, xenon based gases, polyatomic n-perfluorobutane, tetrafluoroethane (R134A), pentafluoroethane (R125), and combinations thereof.

7. The method of claim 2 wherein the gas injection system comprises a direct gas injection system positioned on at least each wing of the aircraft and positioned on a nose of the aircraft.

* * * * *